Patented Oct. 10, 1950

2,525,655

UNITED STATES PATENT OFFICE 2,525,655

PHENOL-ALDEHYDE-RUBBER DERIVATIVES

James D. D'Ianni, Akron, Ohio, assignor to Wingfoot Corporation, Akron, Ohio, a corporation of Delaware No Drawing. Application November 19, 1946, Serial No. 710,952

2 Claims. (Cl. 260—3)

This invention relates to rubber derivatives, to methods for their preparation and to the use thereof. More particularly, it relates to materials prepared by reacting rubber with an aldehyde and a phenol.

One object of the invention is to produce rubber derivatives which are useful for a wide variety of purposes. Another object of the invention is to provide methods for preparing these rubber derivatives. Another object of the invention is to provide a method for employing these rubber derivatives as adhesives and particularly to provide a method for securing the adhesion of rubber to cellulose, cellulose derivatives and other materials with the production of laminated products having outstanding physical characteristics. Other objects and advantages will appear as the description proceeds.

According to the invention, rubber is reacted with an aldehyde and a phenol to produce rubber derivatives which may be used for molding, coating and other purposes and are particularly useful as adhesives.

The reaction of rubber with an aldehyde is illustrated by the following examples.

Example 1

One gram of a 40% solution of boron fluoride in ether diluted with 10 ml. of benzol was added slowly, with stirring, to a mixture consisting of 100 grams of a 15% rubber cement in benzol, 3 grams of paraformaldehyde and 250 ml. of benzol, the mixture being maintained at reflux temperature during the addition. The mixture quickly gelled but, on standing three weeks in diffused daylight, it reverted largely to the sol state.

Example 2

A mixture of 600 grams of dead milled rubber and 120 grams of paraformaldehyde was masticated in a small dough mixer while 30 ml. of a solution of boron fluoride in ether was added slowly over a period of 2-3 minutes. The mixing was then continued for about one hour at a temperature of about 60-70° C. The crude product, which weighed 721 grams, could be milled, calendered into sheet form, or dissolved in benzol. When the crude product was dissolved in benzol, it set to a gel, probably due to the continued presence of boron fluoride. Therefore, it is preferable to wash the product with warm water on a washing mill and dry it before dissolving, since this gives a more satisfactory cement with greater stability.

Of the aldehydes which may be employed, formaldehyde is the preferred material. It may be used in the form of formaldehyde itself or in any of those forms which are generally recognized to be equivalents, e. g., paraformaldehyde, trioxane, etc. Other aldehydes may also be used, such as acetaldehyde, propionaldehyde, butyraldehyde, furfural, and benzaldehyde, the aliphatic aldehydes being preferred.

The reaction of rubber with a phenol is illustrated by the following examples.

Example 3

Five hundred grams of dead-milled rubber and 100 grams of phenol were worked in a dough mixer until homogeneous, then 25 ml. of a 40% solution of boron fluoride in ether were added over a period of 1-2 minutes and the mixing was continued for about an hour and a half at a temperature of about 50-60° C. The product, a dark-red dry powder, was washed with water on a washing mill and dried on hot rolls. It weighed 525 grams.

Example 4

A similar product was prepared in a similar manner using a mixture of zinc chloride and glacial acetic acid as the catalyst.

Other phenols such as the cresols, xylols, dihydroxy benzenes, dihydroxy diphenyl, alkoxy phenols, chlorophenols, various naphthols, etc. may be employed in place of the phenol of the above examples. Phenols having at least one unsubstituted carbon atom in the ortho or para position are preferred.

Although boron fluoride is a preferred catalyst, other condensation catalysts may also be employed to promote the formation of the aldehyde and phenol derivatives. The condensation catalyst apparently produces some condensation or cyclization of the rubber molecules. In addition, the rubber reacts with the added material to produce a complex product involving addition to or condensation with the added material. Thus, in general, any condensation catalyst which will cause condensation or cyclization of the rubber molecules may be used. The halides of the amphoteric metals are a preferred class. Further examples are sulfuric acid, phenol sulfonic acid, toluene sulfonic acid, various chlorsulfonic acids, aluminum chloride, ferric chloride, chromic chloride and others well known in the art. The conditions of the reaction in preparing the rubber derivatives will vary with the choice of catalyst and starting materials. For example, boron fluoride causes a relatively rapid reaction while a mixture of zinc chloride and glacial acetic acid is slower. In general, the temperature will be in the range from 15 to 125° C. The time of reaction may be as short as 15 minutes or as long as 3 or 4 hours. The aldehyde and phenol may be used in widely varying proportions, 20-50% based on the rubber having been found to be satisfactory, quantities from 10-35% actually being retained by the rubber.

The conjoint products from rubber, an aldehyde and a phenol may be prepared by preparing the aldehyde-rubber and phenol-rubber derivatives as intermediates and then mixing these, for example on a rubber mill, preferably warming the mixture. Thus, the product of Example 1 or 2 may be blended on a rubber mill or in an internal mixer with the product of Example 3 or 4 and the heat resulting from the mechanical working of the mass utilized to promote the formation of the conjoint product. Alternatively, the aldehyde-rubber and phenol-rubber may be dissolved in a solvent, for example benzene or toluene, and warmed, after which the product may be recovered by evaporating the solvent or by mixing the solution with a non-solvent to precipitate the product.

Another method for preparing the conjoint product is to prepare the aldehyde-rubber derivative and then react it with a phenol.

Regardless of which method is used for the preparation of the conjoint product, various aldehydes and phenols may be employed, as previously indicated.

It is believed that the aldehyde-rubber derivative is a methylol rubber and that the phenol-rubber derivative involves a linkage of the rubber molecule to the aryl ring, retaining the phenol character in the product. Therefore, the formation of the conjoint rubber-aldehyde-phenol product is believed to be analogous to the formation of phenol-aldehyde resins. A catalyst such as hydrochloric acid or caustic soda may be employed in this step.

If desired, an excess of phenol or aldehyde may be used in preparing the phenol-rubber and aldehyde-rubber derivatives, respectively, and such excess may, if desired, be converted to phenol-aldehyde resin in the final step of forming the conjoint product.

The rubber derivatives described are useful for many purposes but they are particularly advantageous in the preparation of adhesives and are eminently suitable for use in laminating rubber to cellulosic products, the latter type of lamination often giving considerable difficulty, especially when the cellulose is in regenerated form, as in rayon or cellophane. In using the derivatives in the lamination of rubber to cellulose, it is sometimes, though not always, desirable to employ them in conjunction with an organic diisocyanate, this procedure being especially advantageous when the cellulose is in regenerated form. Various diisocyanates either aromatic or aliphatic, may be used. Illustrative examples are para-phenylene diisocyanate, meta-phenylene diisocyanate, the diphenylene diisocyanates, methylene di(p-phenylene isocyanate), ethylene di(oxy trimethylene isocyanate), and the diisocyanates of dipropyl ethers. Methylene di(p-phenylene isocyanate) gives outstanding results, may be prepared from readily available materials and constitutes a preferred example. If desired, the cellulose may be treated with the diisocyanate and thereafter treated with the rubber derivative and then laminated to rubber or, if desired, the diisocyanate may be added to the solution of the rubber derivative and the cellulose coated with the mixture. From the practical standpoint, the latter procedure is preferred and it has been found that particularly good results are obtained if a cement containing the rubber derivative and the diisocyanate is prepared and allowed to stand before use, for example, for about 24-48 hours.

If a rayon cord is first dipped into a resorcinol solution and then into one containing formaldehyde-rubber, an improved adhesion to rubber is noted, the figure being about 13½-14 pounds. Presumably, a resorcinol-formaldehyde-rubber complex favorable to adhesion is formed on the cord.

The use of the adhesive compositions has been particularly described in connection with the lamination of regenerated cellulose to rubber since this is an especially difficult problem which emphasizes the merit of the invention, but the adhesives are also excellent for securing natural cellulose, such as cotton cord, to rubber and for securing rubber to cellulose derivatives and to glass fibers and for other purposes.

This application is a continuation-in-part of application Serial No. 407,604 filed August 20, 1941 and now abandoned.

I claim:

1. The process which comprises reacting 100 parts of rubber with 20-50 parts of an aldehyde in the presence of a condensation catalyst for rubber and then reacting the aldehyde-rubber thus obtained with a phenol.

2. The process which comprises reacting 100 parts of rubber with 20-50 parts of formaldehyde in the presence of a condensation catalyst for rubber and then reacting the aldehyde-rubber thus obtained with resorcinol.

JAMES D. D'IANNI.

REFERENCES CITED

The following references are of record in the file of this patent:

UNITED STATES PATENTS

| Number | Name | Date |
|---|---|---|
| 1,640,363 | McGavack | Aug. 30, 1927 |
| 2,024,987 | Ford | Dec. 17, 1935 |
| 2,158,530 | Williams | May 16, 1939 |